(12) United States Patent
Kane et al.

(10) Patent No.: US 6,234,232 B1
(45) Date of Patent: *May 22, 2001

(54) ROBOTIC APPARATUS AND METHOD FOR ASSEMBLING A TIRE TO A RIM

(75) Inventors: John P. Kane, Sterling Heights; Karl D. Sachs, Birmingham, both of MI (US)

(73) Assignee: Aim Automotive Integrated Manufacturing, Inc., Sterling Heights, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/449,329

(22) Filed: Nov. 24, 1999

Related U.S. Application Data

(63) Continuation of application No. 09/088,357, filed on Jun. 1, 1998, now Pat. No. 6,125,904.

(51) Int. Cl.[7] .................................................. B60C 25/135
(52) U.S. Cl. .............................................. 157/1.24; 157/1
(58) Field of Search ............................ 157/1, 1.17, 1.24, 157/1.26, 1.28

(56) References Cited

U.S. PATENT DOCUMENTS

| | | |
|---|---|---|
| 3,545,463 | 12/1970 | Mueller . |
| 3,920,972 | 11/1975 | Corwin, Jr. et al. . |
| 4,373,804 | 2/1983 | Pryor et al. . |
| 4,389,561 | 6/1983 | Weman et al. . |
| 4,504,919 | 3/1985 | Fujii et al. . |
| 4,589,184 | 5/1986 | Asano et al. . |
| 4,621,671 | 11/1986 | Kane et al. . |
| 4,673,016 | 6/1987 | Damman et al. . |
| 4,800,944 | 1/1989 | Kane . |
| 4,830,079 | 5/1989 | Onuma . |
| 4,852,237 | 8/1989 | Tradt et al. . |
| 4,894,103 | 1/1990 | Bailey . |
| 4,894,901 | 1/1990 | Soderberg . |
| 5,283,943 | 2/1994 | Aguayo et al. . |
| 5,458,177 | 10/1995 | Magnani . |
| 5,472,034 | 12/1995 | Corghi . |
| 5,495,410 | 2/1996 | Graf . |
| 5,604,314 | 2/1997 | Grahn . |
| 5,649,582 | 7/1997 | Hjorth-Hansen . |
| 5,917,726 | 6/1999 | Pryor . |
| 6,035,243 | 3/2000 | Galuga et al. . |
| 6,055,487 | 4/2000 | Margery et al. . |

FOREIGN PATENT DOCUMENTS

WO 00/26128    11/2000   (WO) .

*Primary Examiner*—James G. Smith
(74) *Attorney, Agent, or Firm*—Young & Basile, P.C.

(57) ABSTRACT

A tire mounting apparatus for mounting a flexible tire on a rim includes a robot having at least one articulated joint and a wrist. The robot is moveable with at least three degrees of freedom along a selectable one of a plurality of programmable predetermined paths. A central processing unit selectively executes any one of the plurality of paths stored in memory. A bead mounting tool is attachable to the wrist of the robot for movement along the selected one of the plurality of programmable predetermined paths of the robot. The tool is orientatable with at least three degrees of freedom independent of the selected one of the plurality of programmable predetermined paths. A workpiece support positions the rim in a predetermined location with respect to the robot and positions the tire in a predetermined orientation with respect to the rim. A signal is generated and sent to the robot corresponding to a size of the rim and tire combination to be assembled. The central processing unit selects one of the plurality of predetermined paths corresponding to the rim and tire size combination. The robot includes one or more sensors for measuring load on the articulated joint and wrist during a tire mounting cycle. The control program includes a sensor monitoring function for stopping movement of the tool in response to a load greater than a predetermined value. A clamp member prevents rotation of the tire with respect to the rim as the tool works a bead of the tire over the rim

11 Claims, 4 Drawing Sheets

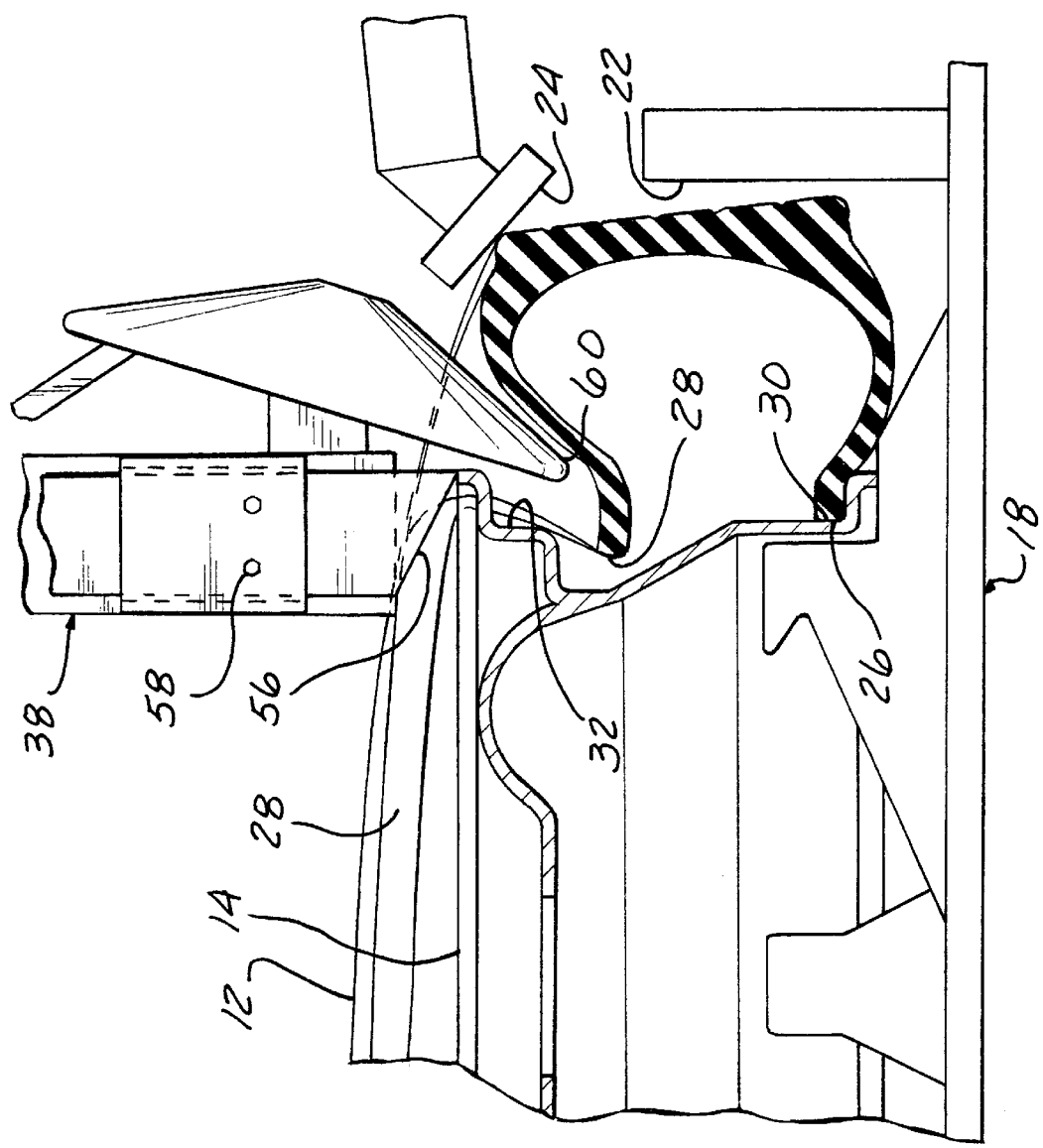
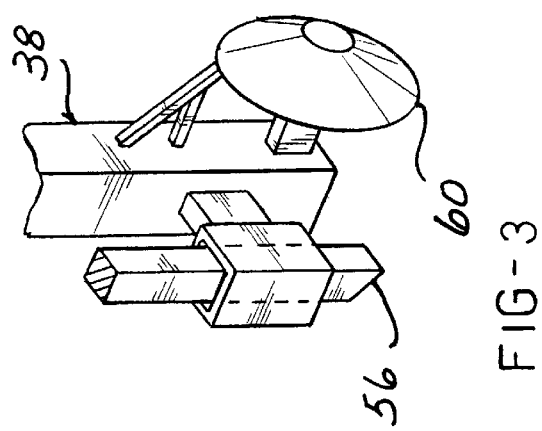
FIG-1
FIG-3

ROBOTIC APPARATUS AND METHOD FOR ASSEMBLING A TIRE TO A RIM

This is a continuation of U.S Pat. No. 6,125,904, Ser. No. 09/088,357, filed Jun. 1, 1998.

FIELD OF THE INVENTION

The present invention relates to a robotic apparatus for assembling a tire to a rim in an automated fashion with programmable movement capable of adapting for different size tires and rims on the same production line.

BACKGROUND OF THE INVENTION

Previous devices and methods have been proposed for mounting vehicle tires on rims when automatic means are used to spread the tire bead and force the tire over the rim to produce the assembling operation. In the state of the known devices, the rim is mounted on a conveyor, and a tire is supported on the rim in a preliminarily assembled relationship. The rim and tire are then moved to the mounting apparatus. The mounting apparatus spreads the bead of the tire and forces the tire over the wheel rim to locate the tire between the wheel rims so that the tire is then ready for inflation. In the case of a tube-type tire, an additional step is required in order to place and locate the tube within the tire carcass.

The tubeless tire configuration has been conventional in the art for an extended period of time, however in recent years the diameter of the rims, width of the tires and height of the tires have been subject to enormous variation and different combinations in an attempt to design a vehicle tire suited to a particular vehicle model having the desired handling and performance characteristics sought by the purchasing public. In view of the wide variety of vehicle tire and rim configurations, it has been difficult to provide an automatic mounting device capable of adapting to various rim sizes and wheel sizes in different combinations without undue downtime in order to reconfigure the tire mounting head for the specific size of rim and tire to be assembled. Therefore, it would be desirable to provide a tire mounting apparatus capable of efficient, rapid and economical operation when faced with a variety of rim sizes and tire sizes on the same tire mounting production line.

SUMMARY OF THE INVENTION

The present invention provides a tire mounting apparatus and method which is continuous and automatic, efficient, rapid and economical in operation. The present invention discloses a tire mounting apparatus for mounting a flexible tire on a rim. The apparatus includes a robot having at least one articulated joint and a wrist. The robot is moveable with at least three degrees of freedom along at least one of a plurality of programmable predetermined paths. The predetermined path can include varying one or more of the three dimensional positions of the path, as well as one or more of the three orientations of the tool, during a single cycle or rotation. A central processing unit selectively executes any one of the plurality of programmable predetermined paths stored in memory. A bead mounting tool is attachable to the wrist of the robot for movement along the selected one of the plurality of programmable predetermined paths of the robot. The tool can be oriented with at least three degrees of freedom independent of the selected one of the plurality of programmable predetermined paths. A workpiece support positions the rim in a predetermined location with respect to the robot and positions the tire in a predetermined orientation with respect to the rim. Means for generating at least one signal to the robot is provided, where the signal corresponds to a size of the rim and tire. The central processing unit selects one of the plurality of programmable predetermined paths corresponding to the rim and tire size indicated by the signal. This configuration permits the central processing unit or robot to sense the rim and tire size, or to receive other input corresponding to the rim and tire size in order to adapt "on-the-fly" to various rim and tire sizes being produced on the production line. The present invention also allows the control of the bead mounting tool to be infinitely variable, such that the elevation, angle and/or pitch of the tool can be changed during its path around the outer periphery of the rim for a particular rim and tire size configuration, and/or the three dimensional path of the tool can be changed to accommodate the particular rim and tire size being mounted. By way of example and not limitation, the path of the tool can be programmed to be either elliptical or circular, or curved in three dimensions (e.g. x-axis, y-axis, and z-axis) as required to effectively mount a particular rim and tire size configuration, while the orientation of the tool can be programmed to change during a single cycle from a pitch of 0° with respect to a vertical axis to a pitch of 45° with respect to the vertical axis, while maintaining the yaw angle at a substantially constant angle with respect to the vertical axis or changing the yaw angle with respect to the vertical axis, as the rotational orientation of the tool about the vertical axis changes (e.g. rotating through 360°) to maintain a substantially consistent presentation of the tool face with respect to the rim.

Preferably, the path of the tool is designed and selected to provide the minimum resistance to mounting a particular rim and tire size combination. It is also desirable in the present invention to monitor the internal load sensing functions built into typical robotic drives or arms and compare the sensed load to a predetermined value. The load sensors can take the form of current sensors for the motors driving the movement of the various joints, and/or stress and strain gauges mounted at appropriate locations on the robotic arm, or combinations thereof. In the preferred configuration, the current used to power the motors responsible for moving the joints of the robotic arm are monitored and compared to predetermined values in order to determine if a load greater than the predetermined value is experienced as the bead mounting tool is moved in the selected programmable path for mounting the rim and tire combination. It is desirable in the present invention to diagnose if there is a processing problem. By way of example and not limitation, a processing problem can include an incompatible combination of tire and rim (e.g. tire to big for rim, tire to small for rim, missing rim, missing tire, etc.), or lubrication problems, such as a soaper malfunction. The processing problem is diagnosed by sensing the load required to move the tool along the selected programmed path for the particular rim and tire size combination. It is also desirable in the present invention, to program the least resistance path in order to provide less stress on the tire as it is mounted on the rim to produce the assembled wheel ready for inflation. Furthermore, it is desirable in the present invention to provide a closed loop feedback system not available in prior known tire mounting systems.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a detailed cross-sectional view of a bead mounting tool engaging a side wall of a tire for mounting on a rim according to the present invention;

FIG. 3 is a, detailed perspective view of the bead mounting tool;

DESCRIPTION OF THE PREFERRED EMBODIMENT

Figure 2:
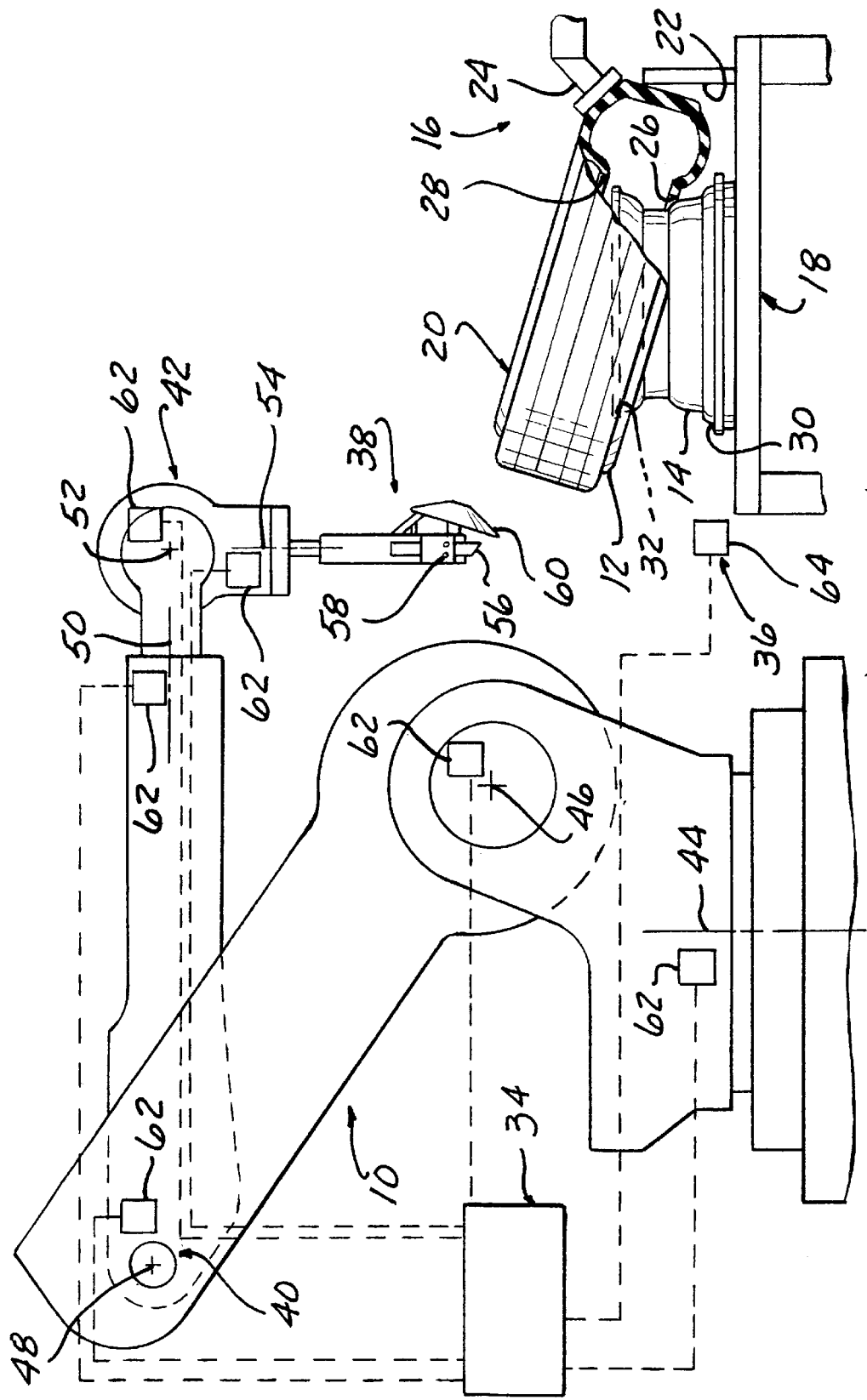
FIG. 2 is a simplified schematic view of a robot for moving the bead mounting tool along selected programmable paths for mounting the tire on the rim and a schematic representation of control means for controlling the robot positioned at the tire mounting work station of a wheel assembly line.

The present invention discloses a robotic apparatus 10 and method for assembling a tire 12 to a rim 14 to produce an assembled wheel ready for inflation. A tire mounting station 16 is provided where the robotic apparatus 10 is positioned in a predetermined location with respect to a tire 12 and rim 14 combination to be assembled. The tire mounting station 16 can be formed as a "stand-alone" mounter, or in combination with a "pick-and-place" apparatus for the tire and rim, or as part of a pallet conveyor system designated generally 18 of conventional construction which is driven in intermittent movement. The "stand-alone" mounter can require manual positioning of the rim and tire at the tire mounting station 16. The "pick-and-place" apparatus can be separate from the robotic apparatus 10, or can be in the form of an interchangeable "pick-and-place" end effector for the robotic apparatus 10. For purposes of illustration, the pallet conveyor system 18 is of conventional, well known construction and carries a plurality of spaced pallets which in turn carry a wheel 20 for assembly of the tire 12 with respect to the rim 14 of the wheel 20.

At some point on the pallet conveyor system 18, upstream from the tire mounting station 16 or at the tire mounting station 16 immediately prior to activation of the robotic apparatus 10, a tubeless tire 12 is rested in a predetermined inclined position on the rim 14 of the wheel 20 (e.g. by manual positioning, or by positioning with an automated apparatus, such as with a "pick-and-place" machine, or by positioning with a robotic apparatus having a "pick-and-place" end effector). The inclined position of the tire 12 on the rim 14 can be such as that shown in FIGS. 1 and 2. The edge of the wheel can be resting against a seat 22. The rim 14 of the wheel 20 is held in a non-rotatable predetermined position with respect to the robotic apparatus 10. The tire 12 of the wheel 20 is held in a non-rotatable position by a tire-engaging clamp 24. The conveyor 18 is driven in step by step movement to advance the pallets to a series of work stations, where the tire mounting station 16 is illustrated in FIGS. 1 and 2, and to stop the pallets at each work station for a predetermined time period between successive steps of movement, which time period is employed to perform a work operation on the tire 12 and rim 14 of the wheel 20 supported on the pallet.

At some point on the conveyor 18 upstream from the tire mounting station 16, the tire 12 and rim 14 are soaped as is conventional. The soaper can be of well known construction by those skilled in the art. As is also conventional and well known in the art, it has been found that adequate soaping of the beads 26, 28 of the tire and/or seats 30, 32 of the rim 14 is required in order to provide sufficient lubrication for movement of the beads 26, 28 over the rim 14 in order to engage the seats 30, 32 of the rim 14 without damaging the tire 12. In the mechanical tire mounting systems used in the past, it has been difficult, if not impossible, to determine if there has been a previous failure of the soaping mechanism prior to the destruction or damage of one or more tires being engaged by the tire mounting mechanism. Except for expensive vision systems or manual inspection, it has also been difficult to determine if the correct size combination of tire and rim have been arranged properly for the mounting procedure.

In the preferred configuration of the present invention, control means 34 is provided for receiving input signals and processing information according to a program stored in memory. The control means 34 can include a microprocessor or central processing unit for executing the instructions from programs stored in memory. The control means 34 can receive input from a suitable device 36 corresponding to the size of a tire 12 and rim 14 positioned at the tire mounting station 16 for assembly. Based on the tire/rim size input signal, the control means 34 selects an appropriate programmable predetermined path for the bead mounting tool 38 to mount the particular size tire 12 and particular size rim 14 with respect to one another corresponding to the tire and rim size combination indicated by the input signal. Preferably, the control means 34 of the present invention can be preprogrammed with a plurality of programmable predetermined paths for the bead mounting tool 38 corresponding to various sizes of tire and rim combinations. This allows the robotic wheel assembly apparatus according to the present invention to adapt to the particular tire and rim size combination positioned at the tire mounting station "on-the-fly" for increased productivity by eliminating downtime to reconfigure the tire mounting apparatus for a new tire and rim size combination.

In addition, the configuration of the present invention permits the robotic apparatus to be controlled according to a programmable predetermined path selected by the control means 34 matching the particular tire 12 and rim 14 size combination currently positioned at the tire mounting station 16, and at the same time selecting a programmable predetermined orientation of the bead mounting tool 38 as the tool travels along the particular selected programmable predetermined path. This permits customization of both the path and the orientation of the bead mounting tool 38 in order to achieve a mounting cycle for the tire 12 to the rim 14 with a resistance force or load that is less than a predetermined resistance force or load value for the particular tire and rim size combination in order to keep the stress on the tire below the predetermined value. This flexibility in programming the path, orientation and maximum resistance load values along the path of travel of the tool eliminates any damage to the tire during the mounting procedure by stopping further movement of the tool 38 along the predetermined path of travel and orientation if the resistance exceeds a programmable predetermined value.

The robotic apparatus 10 preferably includes at least one articulated joint 40 and a wrist 42. The robotic apparatus 10 is capable of movement with at least three degrees of freedom along a selectable one of a plurality of programmable predetermined paths. This type of robotic apparatus is conventional and well know to those skilled in the art. By way of example and not limitation, a suitable robotic apparatus 10 for use in the present invention can be obtained from Nachi Robotic Systems, Inc. of Novi, Mich. A bead mounting tool 38 is attachable to the wrist of the robot 10 for movement along a selected one of a plurality of programmable predetermined paths of the robot. The tool 38 is orientatable with at least three degrees of freedom independent of the selected one of the plurality of programmable predetermined paths of the robot. By way of example and not limitation, the robot 10 is moveable with at least three degrees of freedom by rotation of the base about a first axis 44, a second axis 46, and a third axis 48, as best seen in FIG. 2. The orientation of the tool is controlled by movement of the outer end of the robot 10 by rotation about a fourth axis 50, a fifth axis 52, and a sixth axis 54. As best seen in FIGS. 2 and 3, the bead mounting tool 38 includes a rim-engaging portion 56. The rim-engaging portion 56 locates the tool 38 with respect to the rim 14, and preferably is adjustable by set screws 58 to adjust the depth of penetration of a tire-sidewall-engaging portion or disc 60 with respect to the rim 14.

The present invention preferably includes one or more sensors 62 for monitoring the load of each articulated joint 40 and/or wrist 42 of the robot 10. The sensor 62 can include one or more current monitors, stress/strain gauges, and/or a combination of the two capable of generating a signal corresponding to the load imposed on the bead mounting tool 38, as the tool engages the tire 12 for mounting the first and second beads 26, 28 on the rim 14. One or more sensors 62 can send a signal to the control means 34 corresponding to the load imposed on the bead mounting tool 38, as the tool moves along the predetermined path and orientation selected for the particular tire 12 and rim 14 size combination currently positioned at the tire mounting station 16. The control means 34 compares the measured load from the sensors 62 to a predetermined value at each position or along each portion of the programmed path to determine if the load has increased to a value greater than a predetermined value. If the measured load exceeds the predetermined value, the control means 34 immediately stops movement of the bead mounting tool 38 in order to prevent damage to the tire 12 being mounted on the rim 14 at the tire mounting station 16. By way of example and not limitation, it is believed that a load sensor configuration according to the present invention can be used in order to determine whether a failure has occurred of the tire soaper and/or rim soaper mechanisms upstream of the tire mounting station 16.

Figure 4:
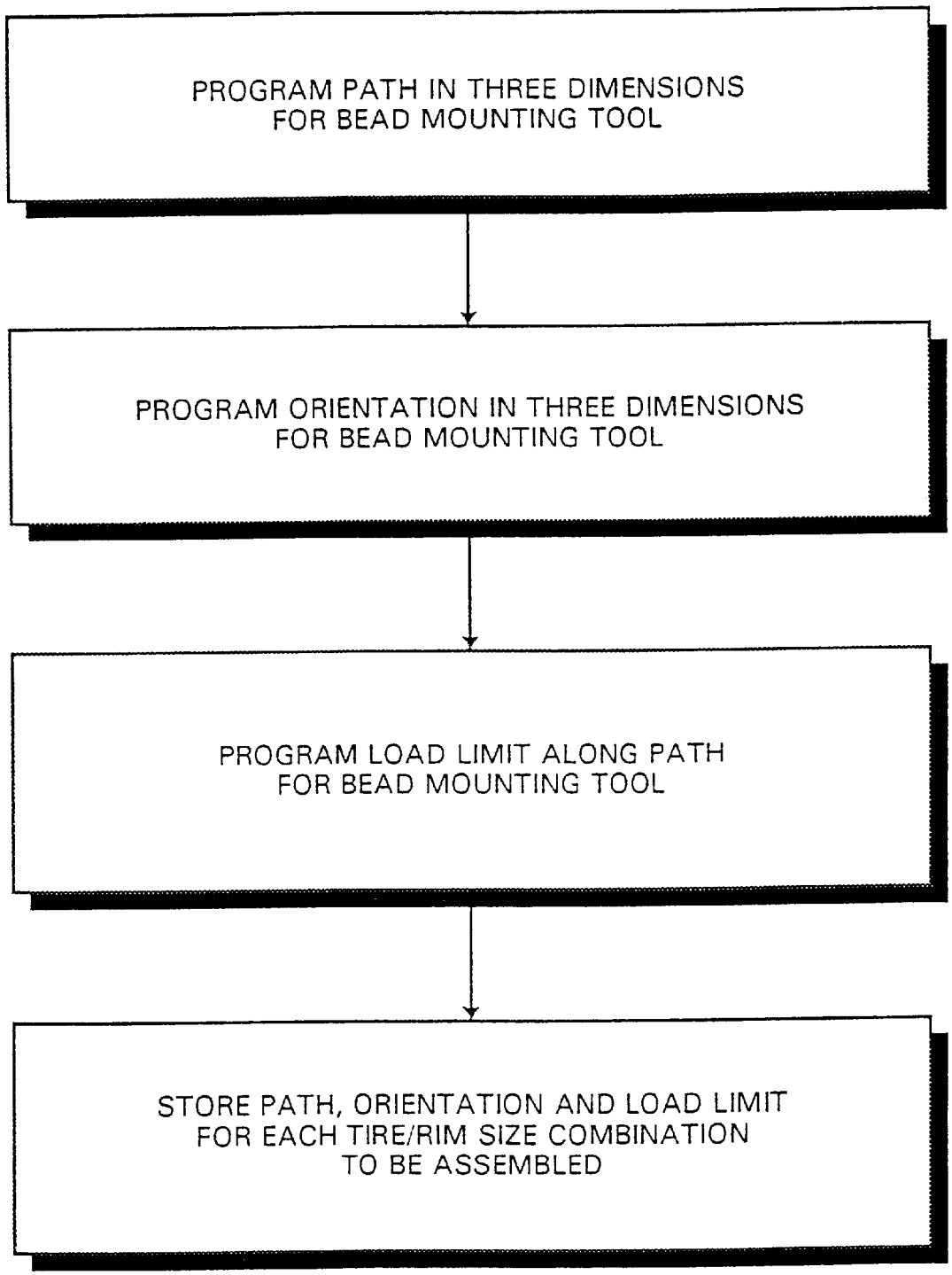
FIG. 4 is a flow diagram illustrating the steps for setting up programmable paths and/or orientations and/or load limits for the bead mounting tool as the tool moves along the path for each tire and rim size combination to be assembled.

Referring now to FIG. 4, a simplified flow diagram is presented illustrating the setup procedure for the control means 34 of the robotic apparatus 10. For each tire and rim size combination to be assembled, a programmable predetermined path is stored in memory corresponding to the desired predetermined three dimensional path of movement of the robot arm supporting the bead mounting tool used to mount the particular tire 12 and rim 14 size combination being programmed. In addition, the orientation of the bead mounting tool 38 is programmed in three dimensions or in three degrees of freedom as previously described. In particular, the robotic path can be described with three degrees of freedom corresponding to the movements with respect to the first axis 44, the second axis 46, and the third axis 48, while the tool orientation can be described with respect to three degrees of freedom corresponding to the fourth axis 50, the fifth axis 52, and the sixth axis 54.

If desired for additional diagnostic capabilities, the present invention preferably includes programmable predetermined load limits or values along the particular path for the bead mounting tool 38. These load limits can be programmed for the particular three dimensional path and orientation of the bead mounting tool as a single predetermined value for all paths, or a specific load limit value that varies along the path for each particular tire and rim size combination if desired. The programmed path orientation and load limit for each tire and rim size combination to be assembled is stored in an appropriate memory location, which can include any type of memory storage device which is conventional and well known to those skilled in the art. By way of example and not limitation, memory can include random access memory, dynamic random access memory, magnetic storage means, optical storage means, digital and/or analog storage devices. The programming procedure is repeated during setup as many times as required to define the programmable path for each tire and rim size combination to be assembled.

Figure 5:
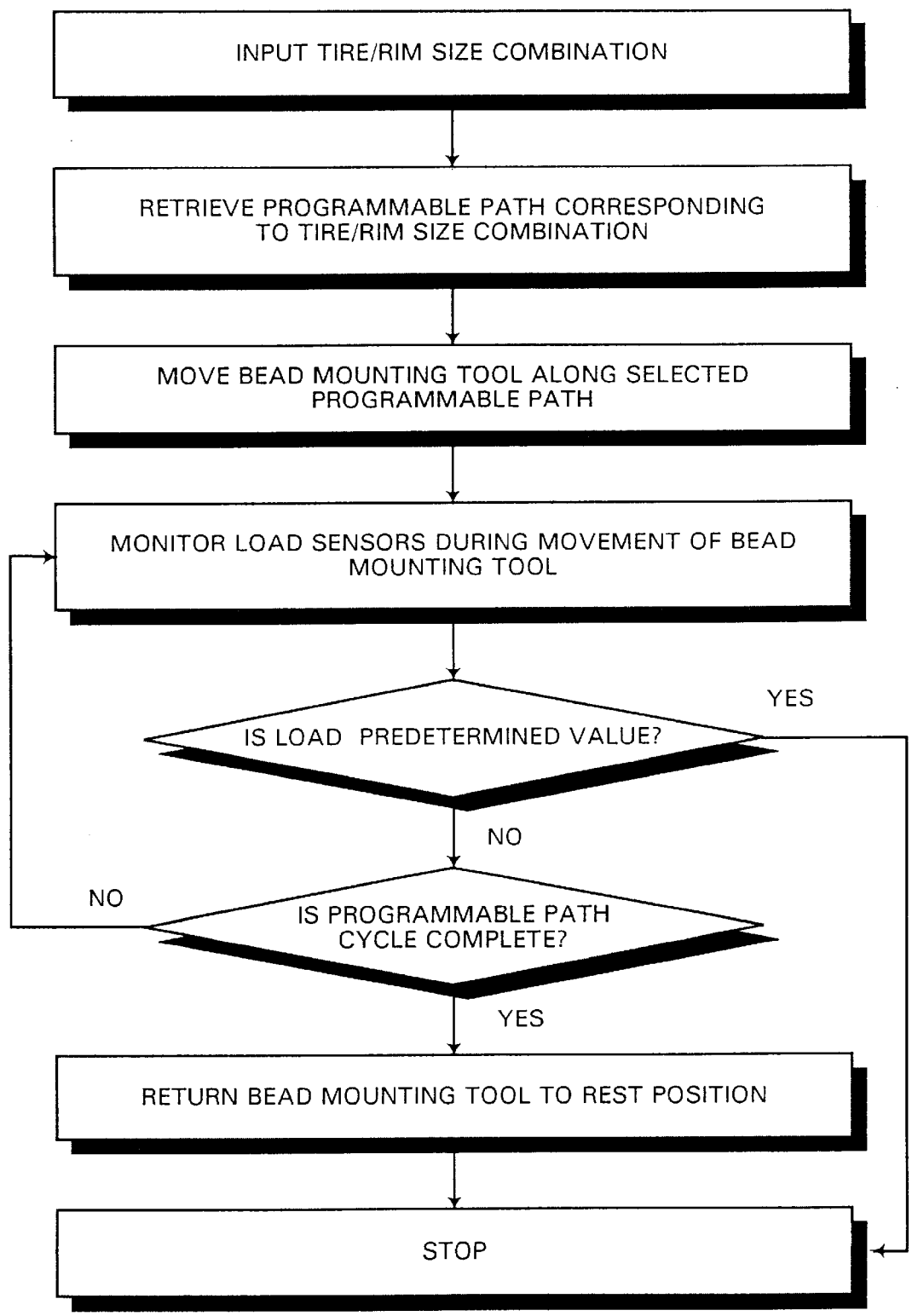
FIG. 5 is a flow diagram illustrating the method of assembling various rim and tire size combinations being produced on the production line "on-the-fly".

Referring now to FIG. 5, the operation of the preferred configuration of the robotic apparatus 10 for mounting a tire 12 to a rim 14 is shown in a simplified schematic flow chart. As best seen in FIG. 2, one or more tire/rim size combination sensor 64 is provided for generating a signal to be sent to the control means 34. The control means 34 receives the tire/rim size combination input signal, and in response to the signal retrieves a programmable predetermined path corresponding to the tire/rim size combination in accordance with the program stored in memory. The control means 34 then operates the robot 10 to move the bead mounting tool 38 along the selected programmable predetermined path and orientation. While the bead mounting tool 38 is moving along the selected programmable predetermined path and orientation, the control means 34 monitors the load sensors 62. The control means 34 determines if the load is greater than a programmable predetermined value. If the answer to that query is no, the program continues and the control means 34 determines if the programmable path cycle is complete. If the cycle is not complete, the programs returns to the step to continue monitoring the load sensor. If the sensed load is greater than a programmable predetermined value, the control means 34 immediately stops further movement of the bead mounting tool 38 by the robot 10 in order to prevent damage to the tire 12 being mounted on the rim 14 at the tire mounting station 16. When the programmable path cycle is complete, the control means 34 moves the robot 10 in order to return the bead mounting tool 38 to a rest position, such as that illustrated in FIG. 2 positioned away from the tire mounting station 16, so that the mounted tire and rim can be moved along the conveyor and a new tire and rim combination can be positioned at the tire mounting station 16 for actuation of another cycle for mounting the tire 12 to the rim 14.

In the preferred programmable cycle of the present invention, the bead mounting tool 38 engages the tire 12 adjacent the tire-engaging clamp 24 and follows the programmable path around the rim 14 in order to spread the first bead 26 over the rim 14 of the wheel 20. After passing through approximately 360° with respect to the rim, the bead mounting tool 38 is in the position as shown in FIG. 1. The second bead 28 is then spread in order to engage the bead 28 over the rim 14 as the bead mounting tool 38 is moved along a second portion of the programmable predetermined path, generally corresponding to a second movement around the entire periphery of the rim 14 in order to position the bead 28 with respect to the rim 14. By way of example and not limitation, the second portion of the programmable predetermined path of movement can correspond to a reverse movement of the bead mounting tool 38 from the path taken during the first portion of the cycle. The robot 10 can drive the bead mounting tool 38 in the opposite rotational movement from that taken during the first portion of the programmable predetermined path of movement used to mount the first bead 26 over the rim 14. After completion of the second portion of the programmable predetermined path of movement around the periphery of the rim by the bead mounting tool 38, the tire 12 is mounted with respect to the rim 14 with the beads 26, 28 in the appropriate position with respect to seats 30, 32 for inflating the tire at an inflation station downstream from the tire mounting station 16.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tire mounting apparatus for mounting a flexible tire on a rim, the apparatus comprising:

a bead mounting tool moveable along a plurality of predetermined paths;

means for generating an electrical signal corresponding to a size of the rim and tire;

means for selectively controlling movement of the tool along one of the plurality of predetermined paths corresponding to the size of the rim and tire in response to the electrical signal; and a clamp member for preventing rotation of the tire with respect to the rim as the bead mounting tool works a bead of the tire over the rim.

2. The apparatus of claim 1 further comprising:

a workpiece support for positioning the rim in a predetermined location with respect to the tool and for positioning the tire in a predetermined orientation with respect to the rim.

3. A tire mounting apparatus for mounting a flexible tire on a rim, the apparatus comprising:

a bead mounting tool moveable along a plurality of predetermined paths;

means for generating an electrical signal corresponding to a size of the rim and tire;

means for selectively controlling movement of the tool along one of the plurality of predetermined paths corresponding to the size of the rim and tire in response to the electrical signal; and the bead mounting tool moveable around an entire periphery of the rim along a first predetermined path to seat a first bead of the tire on the rim and moveable around the entire periphery of the rim along a second predetermined path to seat a second bead of the tire on the rim.

4. The apparatus of claim 3 further comprising:

the first predetermined path moving the bead mounting tool in a first rotational direction around the periphery of the rim and the second predetermined path moving the bead mounting tool in a second rotational direction in an opposite rotational direction from the first predetermined path.

5. A method for mounting a flexible tire on a rim, the method comprising the steps of:

orientating a bead mounting tool moveable along a plurality of predetermined paths;

generating an electrical signal corresponding to a size of the rim and tire;

selectively controlling movement of the tool along one of the plurality of programmable predetermined paths corresponding to the rim and tire size in response to the electrical signal; and preventing rotation of the tire with respect to the rim with a tire-engaging clamp, as the bead mounting tool works a bead of the tire over the rim.

6. The method of claim 5 further comprising the step of:

positioning the rim in a predetermined location with respect to the tool and positioning the tire in a predetermined orientation with respect to the rim on a workpiece support.

7. A method for mounting a flexible tire on a rim, the method comprising the steps of:

orientating a bead mounting tool moveable along a plurality of predetermined paths;

generating an electrical signal corresponding to a size of the rim and tire;

selectively controlling movement of the tool along one of the plurality of programmable predetermined paths corresponding to the rim and tire size in response to the electrical signal;

moving the bead mounting tool around an entire periphery of the rim along a first predetermined path to seat a first bead of the tire on the rim; and moving the bead mounting tool around the entire periphery of the rim along a second predetermined path to seat a second bead of the tire on the rim.

8. The method of claim 7 further comprising the steps of:

moving the bead mounting tool in a first rotational direction around the entire periphery of the rim along the first predetermined path; and moving the bead mounting tool in a second rotational direction along the second predetermined path in an opposite rotational direction from the first predetermined path.

9. In a tire mounting apparatus for mounting a flexible tire on a rim, the improvement comprising:

a bead-mounting tool having a rim engaging portion and a tire engaging portion for forcing the bead of the tire over the rim in response to controlled movement of the tool with respect to the rim and tire, the tool moveable along a plurality of predetermined paths corresponding to a size of the rim and tire to be mounted;

means for electrically controlling movement of the tool and for electrically selecting one of the plurality of predetermined paths in response to the size of the rim and tire to be mounted; and means for preventing rotation of the tire with respect to the rim with a tire-engaging clamp, as the bead mounting tool works a bead of the tire over the rim.

10. In a tire mounting apparatus for mounting a flexible tire on a rim, the improvement comprising:

a bead-mounting tool having a rim engaging portion and a tire engaging portion for forcing the bead of the tire over the rim in response to controlled movement of the tool with respect to the rim and tire, the tool moveable along a plurality of predetermined paths corresponding to a size of the rim and tire to be mounted;

means for electrically controlling movement of the tool and for electrically selecting one of the plurality of predetermined paths in response to the size of the rim and tire to be mounted;

moving means for moving the bead mounting tool around an entire periphery of the rim along a first predetermined path to seat a first bead of the tire on the rim; and the moving means for moving the bead mounting tool around the entire periphery of the rim along a second predetermined path to seat a second bead of the tire on the rim.

11. The apparatus of claim 10 further comprising:

the moving means for moving the bead mounting tool in a first rotational direction around the entire periphery of the rim along the first predetermined path; and the moving means for moving the bead mounting tool in a second rotational direction along the second predetermined path in an opposite rotational direction from the first predetermined path.

* * * * *